(12) United States Patent
Quertelet et al.

(10) Patent No.: US 8,097,808 B2
(45) Date of Patent: Jan. 17, 2012

(54) SEPARATION AND/OR REINFORCEMENT DEVICE FOR A WIRE CABLE DUCT

(75) Inventors: Stephane Quertelet, Remy (FR); James Deciry, Crouy (FR)

(73) Assignee: I.C.M. Group, Montbard (FR)

( * ) Notice: Subject to any disclaimer, the term of this patent is extended or adjusted under 35 U.S.C. 154(b) by 506 days.

(21) Appl. No.: 12/300,216

(22) PCT Filed: May 10, 2007

(86) PCT No.: PCT/FR2007/000789
§ 371 (c)(1),
(2), (4) Date: Nov. 10, 2008

(87) PCT Pub. No.: WO2007/135264
PCT Pub. Date: Nov. 29, 2007

(65) Prior Publication Data
US 2009/0145626 A1    Jun. 11, 2009

(30) Foreign Application Priority Data

May 12, 2006   (FR) .................................... 06 04220

(51) Int. Cl.
*H02G 3/04* (2006.01)
(52) U.S. Cl. ............. 174/97; 174/95; 174/99 R; 248/49; 211/26; 403/329
(58) Field of Classification Search .................. 174/95, 174/97, 99 R; 211/26; 248/49, 68.1; 403/329; 108/108
See application file for complete search history.

(56) References Cited

U.S. PATENT DOCUMENTS 6,023,024 A * 2/2000 Stjerneby ..................... 174/95
6,239,364 B1 * 5/2001 Nickel ........................ 174/480

FOREIGN PATENT DOCUMENTS

| DE | 9313607 | 11/1993 |
| DE | 19726500 | 1/1998 |
| EP | 0752745 | 1/1997 |
| FR | 2612146 | 9/1988 |

OTHER PUBLICATIONS

International Search Report dated Oct. 25, 2007, in PCT application.

* cited by examiner

*Primary Examiner* — Dhirubhai R Patel
(74) *Attorney, Agent, or Firm* — Young & Thompson

(57) ABSTRACT

A device for a wire cable duct (18) has a profiled part having a first wing (2), termed horizontal wing, and at least one second wing (4), termed vertical wing, extending substantially perpendicularly to the first wing on one side thereof. The device includes: at least one longitudinal housing (6) intended to receive a warp wire (20) formed on the lower face (10) of the horizontal wing, that is to say the face opposed to the second wing; transverse cutouts (8), formed with a predetermined pitch corresponding to the pitch of the transverse weft wires (22), all along the horizontal wing (2), the transverse cutouts (8) extending over the whole width of the horizontal wing and continuing into the region of the vertical wings (4); and at least one tongue (12) extending longitudinally from a transverse edge (14) of each cutout (8) over part of the width of the cutout.

14 Claims, 6 Drawing Sheets

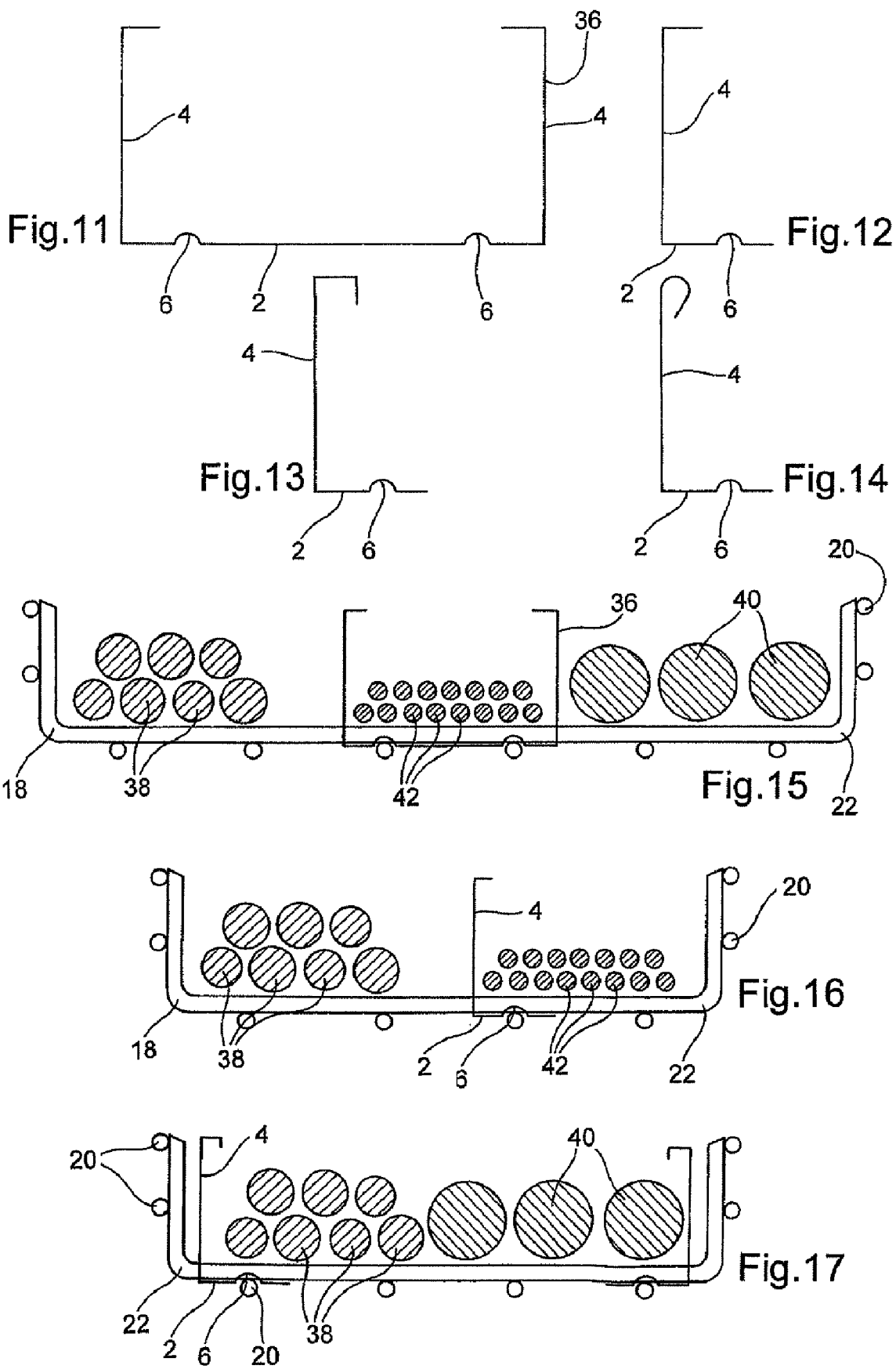

SEPARATION AND/OR REINFORCEMENT DEVICE FOR A WIRE CABLE DUCT

Figure 1:
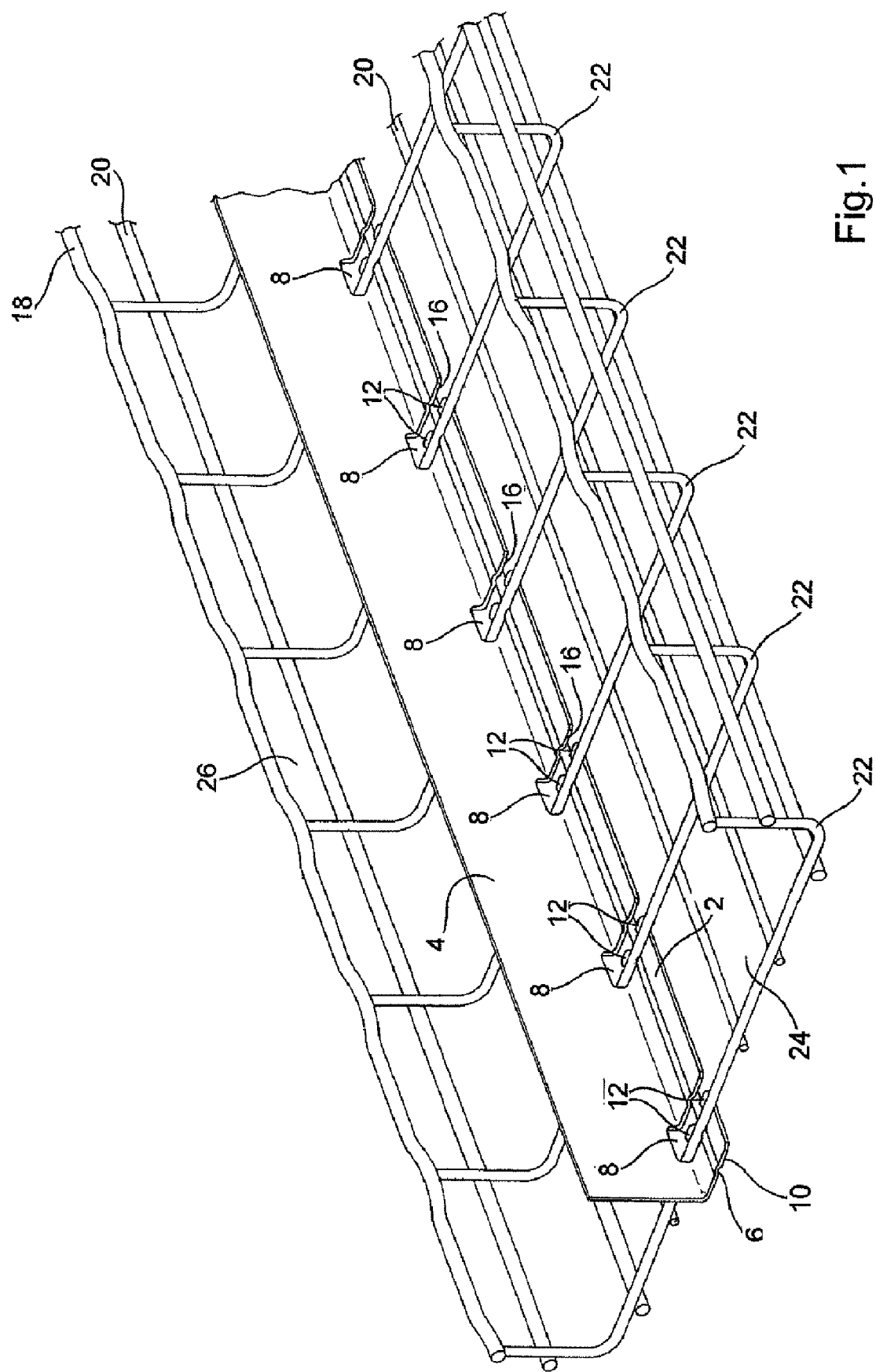

The present invention concerns a separation and/or reinforcement device for a wire cable duct.

Known wire cable ducts take the form of a channel consisting of a wire mesh. This mesh includes on the one hand longitudinal wires, usually called warp wires, and on the other hand transverse wires called weft wires. The warp wires are rectilinear or substantially rectilinear and are welded to the weft wires. The latter are generally approximately U-shaped and are disposed with a regular pitch along the warp wires. Thus a cable duct includes three panels, namely a bottom panel and two lateral panels.

Such cable ducts are commonly used to house, support and protect flexible conduits of various kinds: electrical conduits (low-voltage or high-voltage), data transmission cables (telephone, optical fiber, etc.), fluid conduits, etc.

It is sometimes required to separate conduits of different kinds in a cable duct. Angle-irons bolted to the bottom panel of the cable duct are conventionally used for this. These angle-irons take the form of a section with an L-shaped cross section. One wing of this L-shape is provided with holes, for example, for fixing it by means of bolts to the bottom panel of a wire cable duct and the other wing of the section extends perpendicularly to the first wing and provides the separation between the various conduits. There exist embodiments enabling the angle-irons to be fixed to the bottom panel of a wire cable duct without using bolts.

Another problem that often arises with cable ducts intended to receive conduits of different kinds is the weight of all the conduits placed in the cable ducts. It is then known to use reinforcements to stiffen a wire cable duct and thus to limit its sagging between two supports. Lateral reinforcing stringers are used for this, for example, such as those disclosed by the document FR-2 706 973 of the company Acroba.

It is also known to weld to the bottom panel of a wire cable duct a flat section extending longitudinally, parallel to the lateral panels of the cable duct.

Of the prior art devices discussed above, only the welded flat sections both reinforce the cable duct and separate conduits inside the cable duct. However, cable ducts equipped with this kind of welded flat section are dedicated products and purchased in a finished state. Because of this, it is necessary before carrying out the work on site to specify the number of reinforcements and their position. Thus no freedom is left to the fitter installing the cable duct on site.

The separator angle-irons cannot provide any significant reinforcement of the cable duct to which they are fitted. The lateral reinforcing stringers cannot separate conduits carried by the cable duct.

The present invention aims to provide a device for reinforcing a cable duct and/or separating the conduits that it contains. This device should preferably be quick to fit without accessories (bolts, etc.) and without using tools. It should also advantageously be possible to install this device on site as required.

To solve these problems, the invention proposes a separation and/or reinforcing device for wire cable ducts including on the one hand longitudinal warp wires and on the other hand transverse weft wires, taking the form of a section having a first or horizontal wing and at least one second or vertical wing substantially perpendicular to said first wing on one side thereof.

According to the invention this device further includes:

- at least one longitudinal housing intended to receive a warp wire, produced on the lower face of the horizontal wing, i.e. the face opposite the second wing,
- transverse cutouts produced with a predetermined pitch corresponding to the pitch of the transverse weft wires all along the horizontal wing, the transverse cutouts extending the whole width of the horizontal wing and being extended into the vertical wings, and
- at least one tongue extending longitudinally from a first transverse edge of a cutout to leave a gap between the free end of said tongue and a second transverse edge opposite the first transverse edge.

The vertical wing of this device can serve as a reinforcement and/or a separator wall in a cable duct. The horizontal wing is used to fix the device to the cable duct. The longitudinal housing is intended to receive a warp wire and provides a first bearing point for the reinforcing and/or separation device on the corresponding cable duct. The tongues can fit under a weft wire of the corresponding cable duct, thus forming a second bearing point for the device of the invention. The latter is then securely held on the bottom panel of the cable duct.

Such a device advantageously includes at at least one transverse cutout two tongues extending longitudinally, one on each side of the longitudinal housing. In this way, at the corresponding weft wire, the device is held in such a manner as to prevent any rotation about the warp wire disposed in the longitudinal housing.

To clip a device of the invention to a cable duct, at least one tongue can have in its upper face, oriented toward the vertical wing, a transverse channel intended to receive a weft wire. The transverse channel then serves as a housing for the corresponding weft wire when the separation and/or reinforcing device is correctly positioned on the cable duct.

For locking a separation and/or reinforcing device to a cable duct, at least one tongue can be adapted to be bent. For this tongue adapted to be bent to be able to adapt automatically to the diameter of the wire of the cable duct against which it has just been bent, it is advantageous if the tongue includes an area of trapezoidal shape. If the separation and/or reinforcing device takes the form of a section that can be cut to the required length on demand, it is preferable if each transverse cutout includes at least one tongue adapted to be bent.

In a preferred embodiment of a device of the invention, the longitudinal housing is a longitudinal channel produced in the horizontal wing, for example. This longitudinal channel can have a substantially circular cylindrical shape. This embodiment is adapted to the usual shape of the warp wires of cable ducts.

In a variant of a device of the invention, the device has a U-shaped cross section and therefore includes two vertical wings, for example.

In a further variant of a device of the invention the horizontal wing can include two longitudinal channels.

In an embodiment combining these two variants, the longitudinal channels are disposed at the junction between the horizontal wing and the vertical wings, for example.

Figure 2:
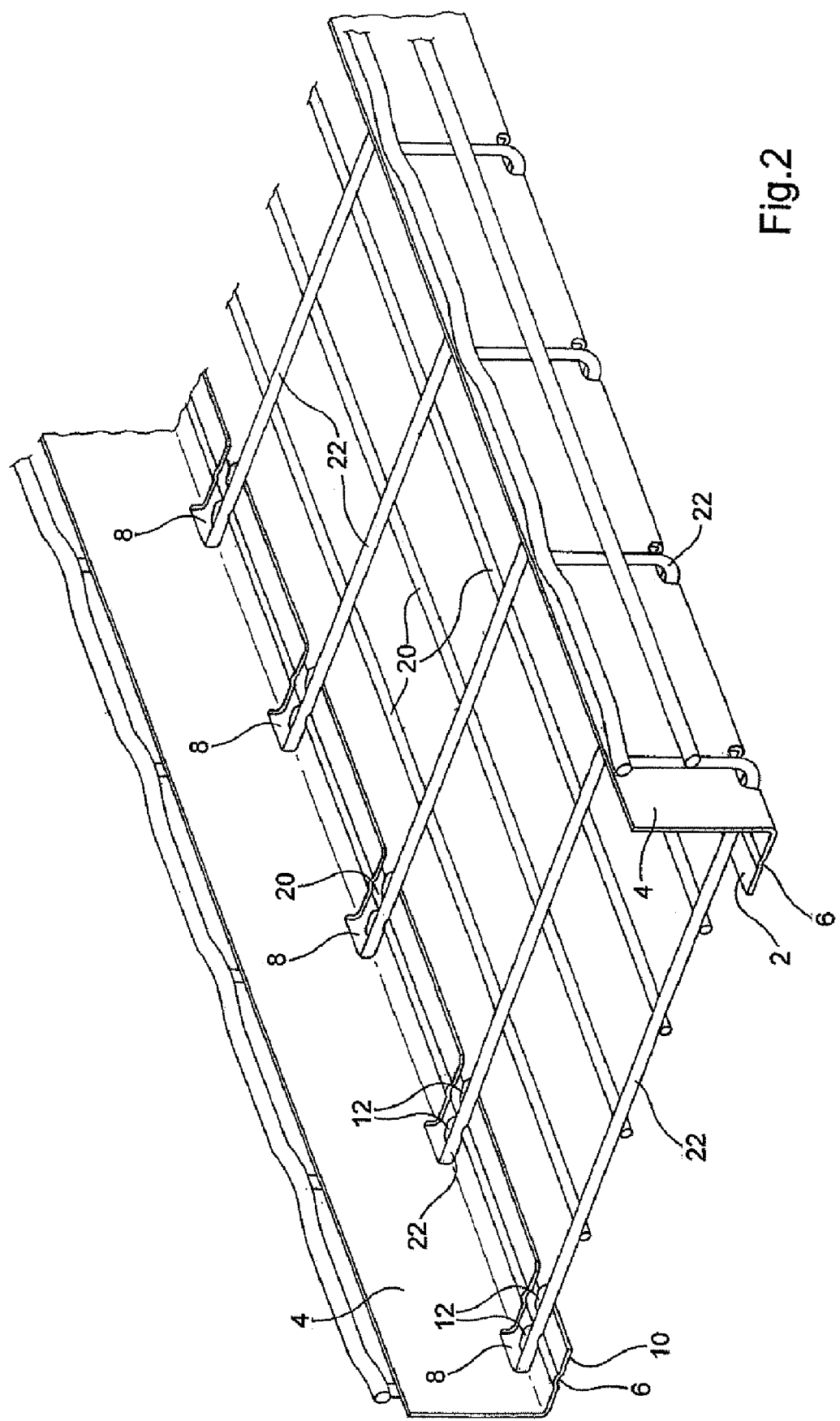
Figure 3:
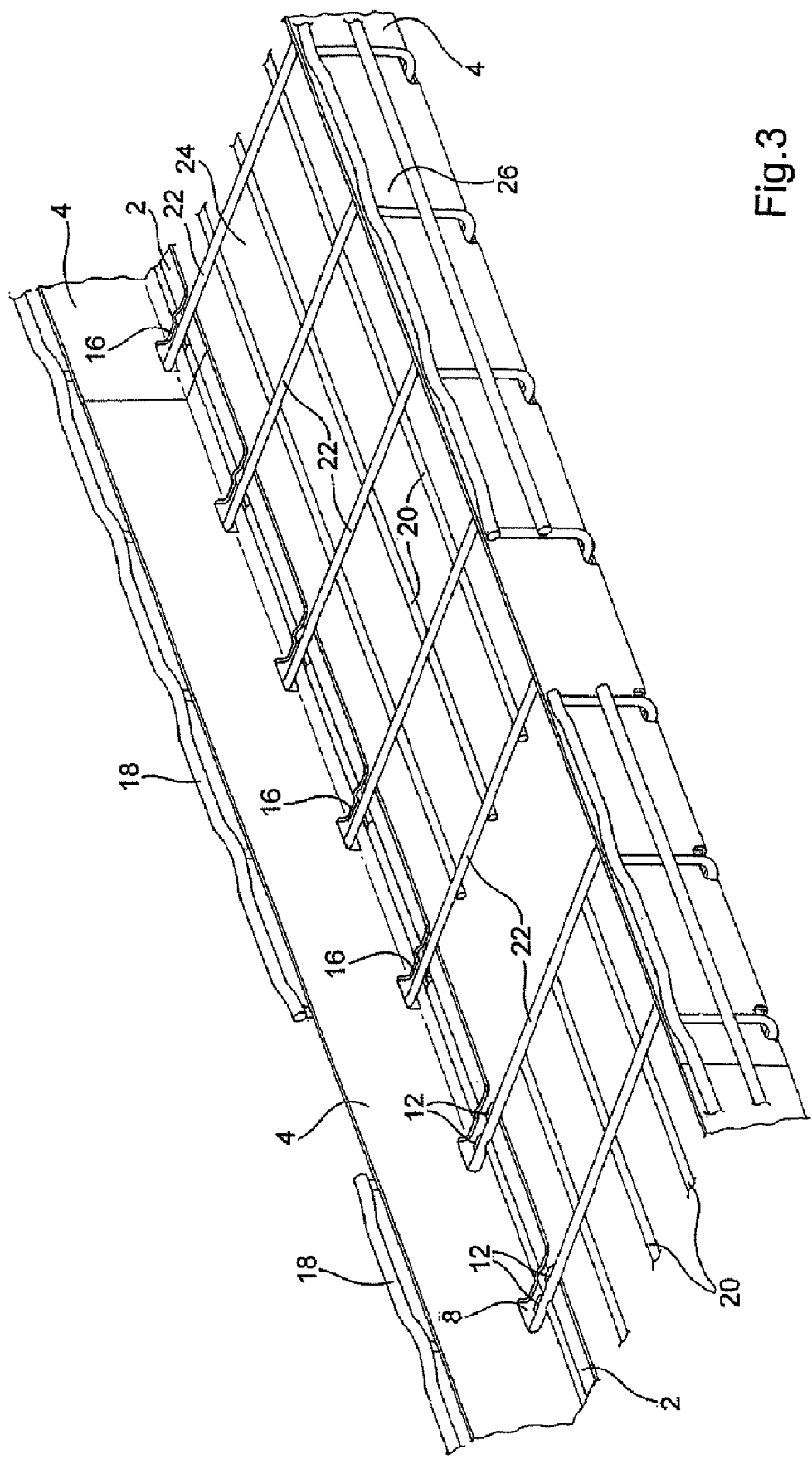
Figure 4:
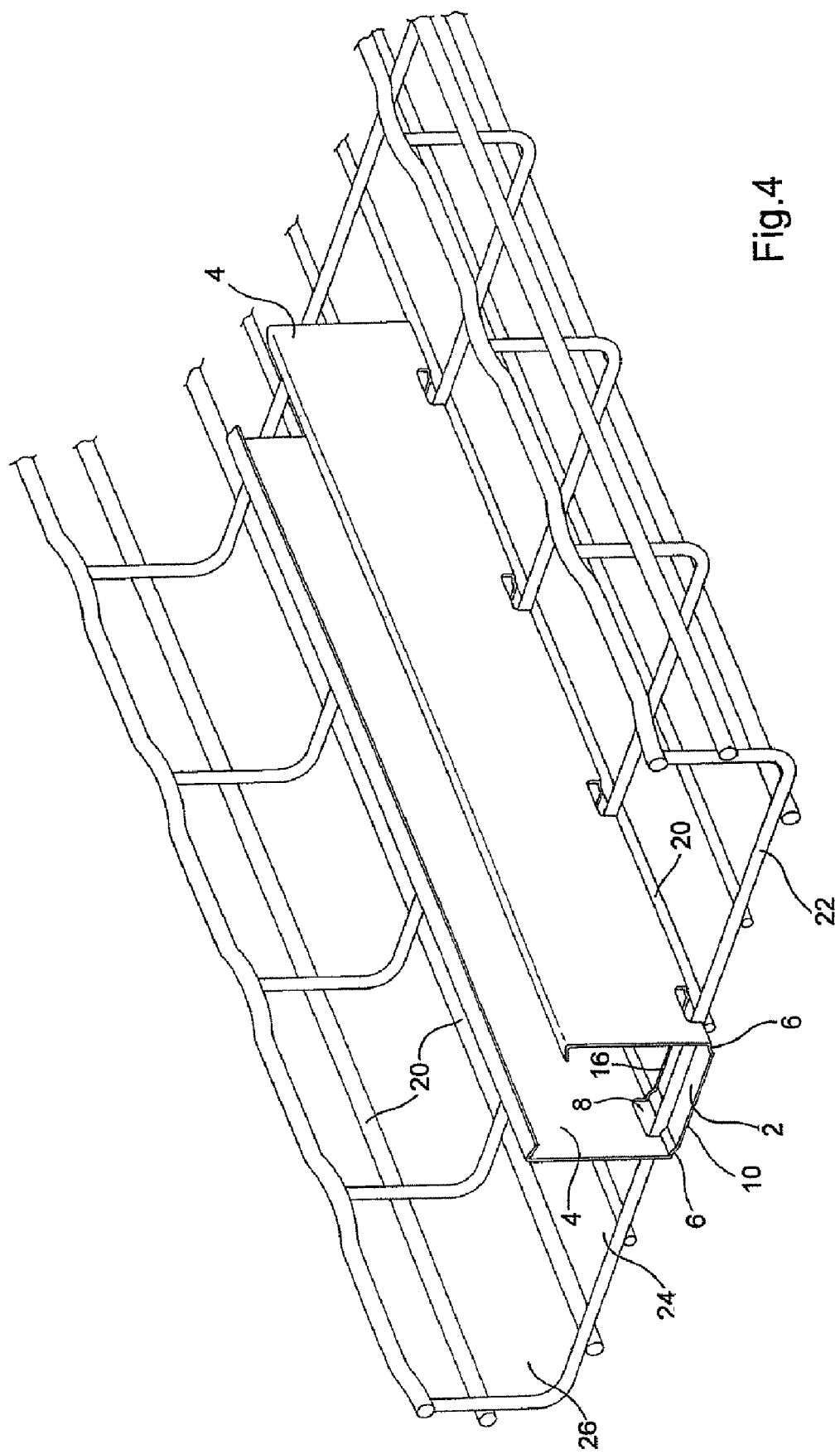
Figure 5:
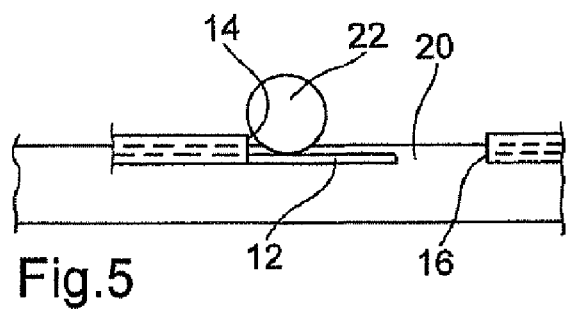
Figure 6:
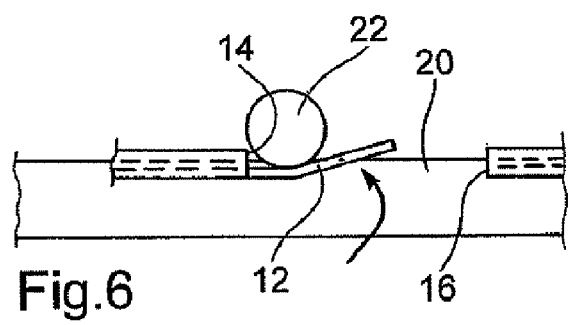
Figure 7:
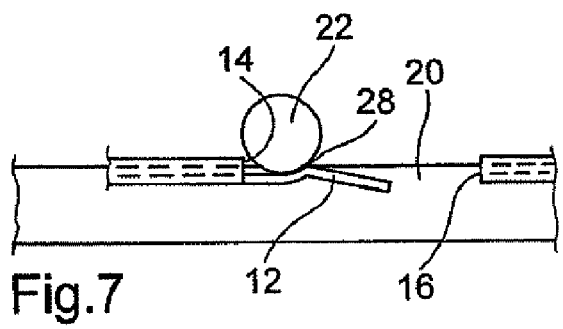
Figure 9:
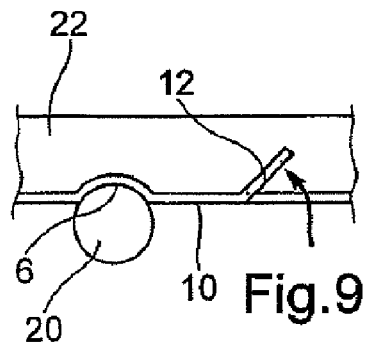
Figure 10:
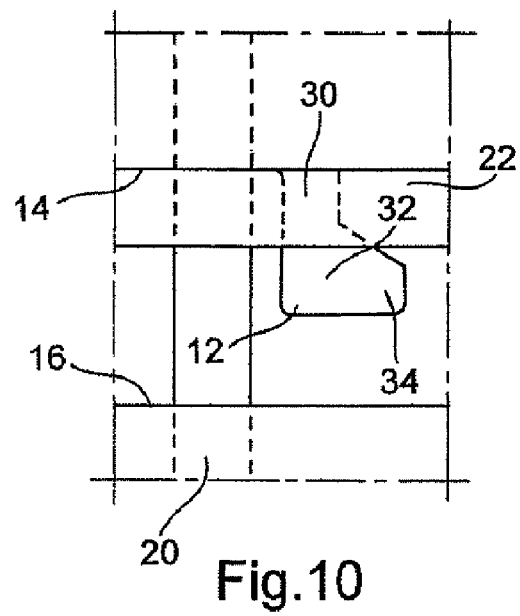
Figure 8:
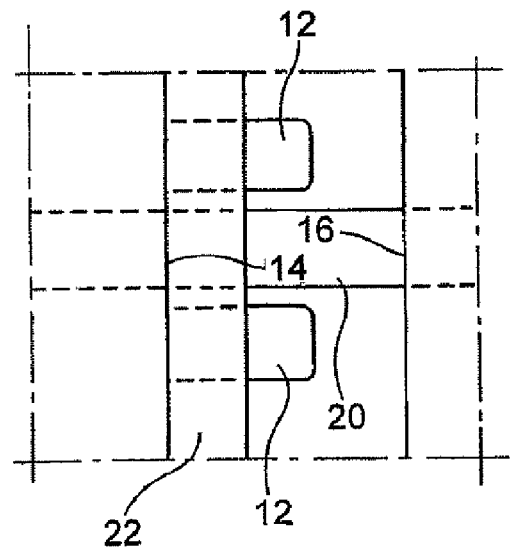

Details and advantages of the present invention will emerge more clearly from the following description, given with reference to the appended diagrammatic drawings, in which:

FIG. 1 represents a device of the invention used as a separation and reinforcing device mounted in a wire cable duct, FIG. 2 represents two devices of the invention mounted in a wire cable duct and used as reinforcing devices, FIG. 3 represents the two devices from FIG. 1 used as splicing plates, FIG. 4 shows a different embodiment of a separation and reinforcing device of the invention, FIG. 5 is a diagram showing the cooperation of a device of the invention with a weft wire of a wire cable duct, FIG. 6 is a view corresponding to that of FIG. 5 with a tongue in its bent position, FIG. 7 is a view corresponding to that of FIG. 5 for a different embodiment, FIG. 8 is a diagrammatic top view corresponding to the three FIGS. 5 to 7, FIG. 9 is a diagram showing the cooperation of the device of the invention with a warp wire of a wire cable duct, FIG. 10 corresponds to a plan view of FIG. 9, FIGS. 11 to 14 are diagrams showing examples of the shape of the cross section of devices of the invention, and FIGS. 15 to 17 illustrate examples of use of separation and/or reinforcing devices of the invention.

FIGS. 1 to 3 represent a first embodiment of a reinforcing and/or separation device of the invention. The device takes the form of a section with an L-shaped cross section including a first or horizontal wing 2 and a second or vertical wing 4. The two wings are perpendicular to each other.

The horizontal wing 2 includes on the one hand a channel 6 and on the other hand cutouts 8.

In the remainder of the description, it is considered that the separation and/or reinforcing device is oriented in the following manner: the horizontal wing 2 is at the bottom and the vertical wing 4 extends upward from the horizontal wing 2.

The channel 6 is produced longitudinally on the horizontal wing 2. The concave side of this channel is on the bottom face 10 of the horizontal wing 2. In the embodiment represented, the longitudinal channel 6 is placed in a median position relative to the horizontal wing 2.

The cutouts 8 produced in the horizontal wing 2 are transverse cutouts that extend the whole width of the horizontal wing 2 and are extended slightly into the bottom of the vertical wing 4. These cutouts 8 are disposed regularly along the horizontal wing 2.

As shown in FIGS. 5 to 8, at least one cutout 8 includes a tongue 12 extending from a transverse edge 14 of a cutout 8. In the embodiment shown, each cutout 8 includes two tongues 12 each extending from the same transverse edge 14. The two tongues 12 of the same cutout 8 are disposed on respective opposite sides of the channel 6.

In one embodiment, represented in the drawings, each cutout 8 has a substantially rectangular shape. In the FIG. 8 embodiment, the tongues 12 are also rectangular and extend from one transverse edge 14 toward the other, opposite transverse edge 16 of the cutout 8 without, however, reaching that opposite transverse edge 16.

Such reinforcing and/or separation devices are intended to be fitted to a length of cable duct 18. Each of the lengths 18 is conventionally in the form of a trough and includes longitudinal wires called warp wires 20 and transverse wires called weft wires 22. The warp wires 20 are rectilinear (except for the edge wires in the embodiment shown, which are nevertheless substantially rectilinear). The weft wires 22 are U-shaped. The length 18 of cable duct therefore has a bottom panel 24 and two lateral panels 26. It is assumed here that the bottom panel 24 is at the bottom of the lateral panels. This bottom panel 24 is disposed in a substantially horizontal plane and the lateral panels 26 are substantially vertical. This kind of orientation is usual for a length of cable duct. Other orientations can be envisaged, however, for example with the bottom panel 24 inclined or disposed vertically.

A separation and/or reinforcing device of the invention is intended to be fitted into a length of cable duct 18. The horizontal wing 2 of the device of the invention is then at the level of the bottom panel 24 of the length of cable duct 18 and the vertical wing 4 of the device is parallel to the lateral panels 26 of the length of cable duct 18. As can be seen in FIGS. 1 to 3 and FIG. 9, the longitudinal channel 6 is intended to receive a warp wire 20 of the length of cable duct 18. This channel has a circular arc shape, for example, the radius of curvature of which corresponds to the warp wire to be placed in the channel. If warp wires with different diameters have to be accommodated in the channel 6, the latter will preferably have a radius of curvature corresponding to the largest warp wire radius.

The tongues 12 fit under the weft wires 22 of the length of cable duct 18.

The dimensions of the separation and/or reinforcing device of the invention are of course adapted to the dimensions of the length of cable duct 18. It has already been explained that the channel 6 is adapted to the diameter of the warp wires 20 of the length of cable tray 18. The pitch between two successive cutouts 8 corresponds to the pitch between the weft wires 22 of the length of cable duct 18. The gap between the free end of a tongue 12 and the opposite transverse edge 16 of the corresponding cutout 8 is sufficient for a weft wire 22 to pass through it. Furthermore, the height of the cutout 8 at the bottom of the horizontal wing 4 substantially corresponds to the maximum diameter of the weft wire intended to be placed in the cutout 8.

To fit the separation and/or reinforcing device of the invention into a length of cable duct, the horizontal wing 2 is placed on a warp wire 20 of the bottom panel 24 of the length of cable duct 18. The channel 6 is disposed over the warp wire 20 and the cutouts 8 are placed over the weft wires 22 so that the latter are located between the free end of the tongues 12 and the opposite transverse edge 16. The separation and/or reinforcing device of the invention is then slid longitudinally to slide the tongues 12 under the weft wires 22. This movement is guided by the warp wire 20 sliding in the channel 6.

The separation and/or reinforcing device of the invention is retained on the one hand by the channel 6 bearing on the warp wire 20 and on the other hand by the tongues 12 bearing on the bottom of the weft wires 22. There can be a slight clamping effect here to retain the device of the invention on the length of cable duct 18. The device is then held by this clamping effect without it being necessary to use any tools.

This clamping effect is obtained by adapting the corresponding dimension to the difference in height between the top face of the tongues 12 (on which a weft wire comes to bear) and the bottom of the longitudinal channel 6 (in which a warp wire comes to be accommodated). Adapting this dimension to the cable duct enables the device to be mounted on the cable duct and, where appropriate, with a greater or lesser clamping effect.

FIGS. 5 and 6 show a first embodiment of a tongue 12. Here it is a plane rectangular tongue lying substantially in the plane of the horizontal wing 2. To lock the device of the invention in its mounted position, especially when the device is used to reinforce the length of cable duct 18, the tongue 12 can be bent around the corresponding weft wire 22 as shown in FIG. 6. This tongue can easily be bent using a screwdriver bearing on the opposite transverse edge 16 of the corresponding cutout 8.

In the FIG. 7 embodiment the device of the invention can be clipped onto a length of cable duct. Here the tongue 12 has on its top face a transverse boss 28 formed at a distance from the transverse edge 14 carrying the tongue 12. This produces a transverse channel on the tongue 12, between the transverse edge 14 and the transverse boss 28. When the device of the invention is fitted to a length of cable duct 18, the device of the invention is slid along the corresponding warp wire 20 until the weft wires 22 pass over the transverse bosses 28 into the transverse channel.

FIG. 8 shows a preferred embodiment in which there is a tongue 12 on each side of the channel 6. Thus the separation and/or reinforcing device is retained perfectly on the bottom panel 24 of the length of cable duct 18. Thanks to this position of the tongues 12, the horizontal wing 2 and therefore the device of the invention cannot pivot about the warp wire 20. In a different embodiment, only one tongue 12 could be provided for each cutout 8. The position of the tongue 12 relative to the channel 6 would preferably then alternate from one cutout to another. The anti-rotation effect would then be obtained with two tongues 12 of two successive cutouts 8 rather than at each cutout.

FIGS. 9 and 10 show a variant of means for locking a device of the invention onto a length of cable duct 18. FIG. 9 is a cross section in which the cross section of a warp wire 20 is seen. FIG. 10 shows a different embodiment of a tongue 12. Compared to the FIG. 8 embodiment, the tongue 12 is no longer rectangular, but has a base 30, a trapezoidal area 32, and a head 34. The base 30 is rectangular and is attached to the transverse edge 14. The trapezoidal area 32 has the shape of a right-angle trapezium and is disposed in such a manner as to widen the tongue 12 in the direction away from the first transverse edge 14. The head 34 is intended to facilitate bending the tongue 12. Whereas in the FIG. 6 embodiment the tongue 12 was bent around a transverse axis, the tongue 12 of FIGS. 9 and 10 is intended to be bent around a longitudinal axis. The bent part of the head 34 then locks the weft wire 22, adapting automatically to its diameter.

In FIG. 1, the separation and/or reinforcing device is fixed to a length of cable duct as described above. It is fixed so that the vertical wing 4 of the device is at a distance from the two lateral panels 26 of the length of cable duct 18. The device of the invention therefore separates conduits placed in the length of cable duct 18. Furthermore, the device also stiffens the length of cable duct 18 by virtue of being fixed to the bottom panel 24 of that length of cable duct 18.

In FIG. 2, two devices of the invention are used to reinforce the length of cable duct 18. These devices are then fixed to the length of cable duct 18 as described above so that the vertical wings 4 of these two devices of the invention are substantially against the lateral panels 26 of the length of cable duct 18. In this embodiment, the devices of the invention only reinforce the length of cable duct.

FIG. 3 shows how a device as described above can also be used as a splicing plate for splicing two lengths of cable duct 18. A device of the invention is fitted so as to straddle two lengths of cable duct 18. To splice lengths of cable duct, the lengths are usually placed end-to-end, but here the lengths are disposed so that the distance between two adjacent weft wires remains constant, even on moving from one length of cable duct to another. A good splice is obtained with two devices of the invention each disposed so that the vertical wing 4 of one device is substantially against one lateral panel 26 of each of the lengths of cable duct 18. The two devices of the invention used to make a splice are preferably disposed with a longitudinal offset, as shown in FIG. 3.

Note that in the embodiments of FIGS. 1 to 3 it is possible to provide two devices of the invention for reinforcing and/or splicing a cable duct and furthermore to provide a third (or even a fourth) to separate conduits in the lengths of cable duct.

FIG. 4 represents a different embodiment of a device of the invention in which two vertical wings 4 are provided. Furthermore, this device of the invention is adapted to be mounted between two warp wires 20. Here the channels 6 are each disposed at the intersection between the horizontal wing 2 and the corresponding vertical wing 4. Here the cutouts 8 extend from one vertical wing 4 to the other. It is clear that here only one tongue 12 is necessary at each cutout 8. For good retention of the device, it is preferable to provide a wide tongue.

FIGS. 11 to 14 show by way of nonlimiting example cross section shapes that the sections used to produce a device of the invention can have. The FIG. 11 embodiment provides two vertical wings 4 and two longitudinal channels 6, thereby producing a U-shaped section. Here the separation between the vertical wings 4 is greater than in the FIG. 4 embodiment. The longitudinal channels 6 are therefore disposed at a distance from the vertical wings 4. Other U-shapes can be envisaged. For example a section with a single longitudinal channel 6 in its horizontal wing 2 can be provided.

The embodiments of FIGS. 12 to 14 are of substantially the same form as FIGS. 1 to 3. Here the free ends of the vertical wings 4 are conformed differently. The angle-iron can be reinforced by stamped areas, in particular in a vertical wing. Openings, not shown, can also be provided, in particular in the vertical wing 4, which can then be used to attach the cables or the like and for example to hold them against the corresponding vertical wing.

Many other sections can be used to produce a device of the invention, of course.

FIGS. 15 to 17 show examples of use of devices of the invention. Thus FIG. 15 shows the use of a trough 36 like that represented in FIG. 11 to separate cables of three different kinds in a length of cable duct 18. Here the trough 36 is mounted in a substantially central position in the length of cable duct 18. It can be assumed that the section of cable duct 18 represented here carries low-voltage cables 38 on one side of the trough, high-voltage cables 40 on the other side of the trough and data cables 42 inside the trough 36.

FIG. 16 substantially corresponds to the FIG. 1 embodiment seen in cross section. Here a reinforcing and separation angle-iron is used in a length of cable duct 18 to separate low-voltage cables 38 and data cables 42, for example. FIG. 17 corresponds to the FIG. 2 embodiment in which the angle-irons used are reinforcing angle-irons that do not separate low-voltage cables 38 and high-voltage cables 40 in the length of cable duct. However, as mentioned above, a third angle-iron can be used here, mounted as represented in FIG. 16, to separate the low-voltage cables 38 and the high-voltage cables 40.

The devices described above can be considered as universal sections adapted to serve both as reinforcements and as separator devices. These devices are easy to fit without using tools. These sections can be cut as required on site when installing a cable duct and then fitted without using any accessories, such as bolts.

These sections can be used throughout the length of the cable duct, for example to separate the conduits routed via the cable duct, but can also be used locally as reinforcing and/or splicing devices. A local reinforcement can be useful when it is not possible to place supports at the required interval or if the cable ducts must locally support a greater load (for example if an accessory is mounted on the cable duct).

Note that, as described above, this device is truly multipurpose because, as well as serving as a reinforcement, it can also splice two lengths of cable duct.

The devices described above also have the advantage of being adaptable to different wire cable ducts and can therefore be described as universal. A given device of the invention will be suited to virtually all cable ducts having an interval between two successive weft wires corresponding to the pitch of the cutouts of the device of the invention. It can also adapt to all warp wire and weft wire diameters usually employed for producing wire cable ducts. Of course, for devices that fit onto two warp wires, it will be necessary for the separation of the warp wires to match the separation of the channels of the device.

Even though a device of the invention can be produced in cut and bent sheet metal, it offers great stiffness and high accuracy.

The present invention is not limited to the embodiments described above by way of nonlimiting example and to the variants referred to. It also concerns all variants that will be evident to the person skilled in the art within the scope of the following claims.

The invention claimed is:

1. A device for at least one of separating and reinforcing wire cable ducts (18) that include longitudinal warp wires (20) and transverse weft wires (22), the device comprising:
   a section having a first wing (2) and at least one second wing (4) substantially perpendicular to said first wing (2) on one side thereof,
   at least one longitudinal channel (6), intended to receive one of said longitudinal wrap wires (20), on a lower face (10) of the first wing (2),
   transverse cutouts (8) with a predetermined pitch corresponding to a pitch of the transverse weft wires (22) all along the first wing (2), the transverse cutouts (8) extending a whole width of the first wing (2) and extending into the at least one second wing (4), and
   at least one tongue (12) extending longitudinally from a transverse edge (14) of at least one of said transverse cutouts (8) to leave a gap between a free end of said at least one tongue and a second transverse edge (16) opposite the first transverse edge (14).

2. Device according to claim 1, further comprising two of said at least one tongue 12), one on each side of said at least one longitudinal channel (6).

3. Device according to claim 2, wherein each of said two tongues (12) has in its upper face, oriented toward the second wing (4), a transverse channel intended to receive one of the transverse weft wires (22).

4. Device according to claim 2, wherein each of said two tongues (12) is adapted to be bent.

5. Device according to claim 1, wherein said at least one tongue (12) has in its upper face, oriented toward the second wing (4), a transverse channel intended to receive one of the transverse weft wires (22).

6. Device according to claim 5, wherein said at least one tongue (12) is adapted to be bent.

7. Device according to claim 1, wherein said at least one tongue (12) is adapted to be bent.

8. Device according to claim 7, wherein said at least one tongue (12) that is adapted to be bent includes an area (32) of trapezoidal shape.

9. Device according to claim 7, wherein each of said transverse cutouts (8) includes at least one said tongue (12) that is adapted to be bent.

10. Device according to claim 1, wherein the longitudinal channel (6) has a substantially circular cylindrical shape.

11. Device according to claim 1, having a U-shaped cross section and including two of said at least one second wing (4).

12. Device according to claim 11, wherein the first wing (2) includes two of said at least one longitudinal channel (6).

13. Device according to claim 12, wherein the two said longitudinal channels (6) are disposed at a junction between the first wing (2) and one of said two second wings (4).

14. Device according to claim 1, wherein the first wing (2) includes two of said least one longitudinal channel (6).

* * * * *